Jan. 14, 1969  W. A. McGREGOR, JR., ET AL  3,421,932
METHOD AND APPARATUS FOR PREPARING CELLULAR POLYURETHANE PLASTICS
Filed Dec. 16, 1965

INVENTORS.
WILLIAM A. McGREGOR, JR.
PAUL G. GEMEINHARDT
JESSE FRED GURLEY, JR.
EDWARD L. REICHARD
WILLIAM F. GAUSS

BY

ATTORNEYS.

United States Patent Office 3,421,932
Patented Jan. 14, 1969

3,421,932
METHOD AND APPARATUS FOR PREPARING CELLULAR POLYURETHANE PLASTICS
William A. McGregor, Jr., Paul G. Gemeinhardt, Jesse Fred Gurley, Edward L. Reichard, and William F. Gauss, Pittsburgh, Pa., assignors to Mobay Chemical Company, Pittsburgh, Pa., a corporation of Delaware
Filed Dec. 16, 1965, Ser. No. 514,223
U.S. Cl. 117—105.3           6 Claims
Int. Cl. B29d 7/08; B05c 5/00

ABSTRACT OF THE DISCLOSURE

Uniform thickness coatings or cellular plastic layers are prepared from highly reactive ingredients by mixing the ingredients and passing the mixed ingredients through a distributing device having a shaping aperture therein so the material emerging therefrom is a coherent, continuous, free-falling liquid film and depositing the free-falling film within less than 75 percent of the gel time when the material is nonporous and within 75 percent of the cream time when the material is cellular onto a surface movable with respect to and disposed beneath the shaping aperture.

---

Figure 1:
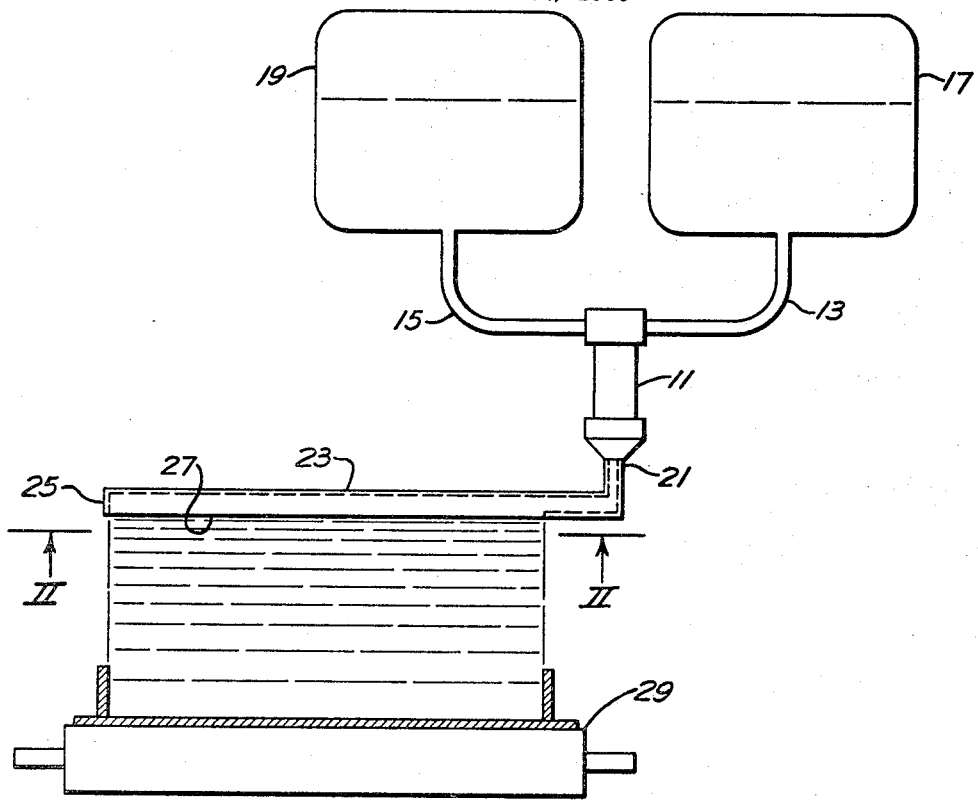

This invention relates to a method and apparatus for preparing cellular polyurethanes and more particularly, to a method and apparatus for preparing cellular polyurethanes having a uniform thickness.

It has been heretofore known to mix the reactants which form a cellular polyurethane and then to deposit the mixed reactants onto a conveyor or suitable mold in a manner which generally distributes the foamable mix in a predetermined pattern. One such method is to have the mixing apparatus disposed in a manner that it moves laterally with regard to the direction of the movable conveyor disposed beneath the mixing device. While this method and apparatus has great commercial significance, it suffers from the disadvantage that the blocks of foam thus prepared are of a nonuniform height or thickness and shear planes are caused in the cellular polyurethane product because of the manner in which the deposited material runs together in the form of waves.

It has been also heretofore known to utilize a series of mixing devices to apply the foamable mixture across the width of the conveyor thereby obtaining a more uniform deposit of the liquid material. Still another method of depositing a uniform layer of foamable reactants is to first apply a liquid material while subjecting the applied material to a high velocity stream of air. This tends to even out the distribution of the material and thus create a more uniform thickness block.

The application of a thin layer of liquid foamable polyurethane ingredients to a surface, such as a conveyor moving beneath the mixing apparatus is complicated by the high reactivity of the ingredients. Thus, in order to apply a uniform liquid layer, a short period of time known as "cream time" is of great importance. "Cream time" is defined as the period of time from the mixing of the reactive components to the point at which the deposited materials become opaque due to the formation of bubbles within the reactive mass as a result of the blowing agent present. The "cream time" varies depending upon the specific formulation used in the preparation of the cellular polyurethane, however, in most instances, it is of short duration.

It is therefore an object of this invention to provide an improved method and apparatus for preparing cellular and polyurethane plastics. It is another object of this invention to provide an improved method and apparatus for preparing cellular polyurethanes of controlled uniform thickness. It is still another object of this invention to provide an improved method and apparatus for depositing a uniform layer of mixed foamable reactants onto a surface.

The foregoing objects and others which will become apparent from the following description are accomplished in accordance with the invention, generally speaking, by providing a method and apparatus for preparing cellular polyurethane plastics having a uniform thickness. In the method of preparation, the ingredients for preparing a cellular polyurethane plastic are mixed and then passed through a shaping device which causes the mixed reactants to form a coherent, continuous free-falling liquid film which is deposited onto a surface movable with respect to the free-falling film. The reactants must be applied to the surface within 75% of the "cream time" of the reactive ingredients. The "cream time" is defined as above.

Figure 2:
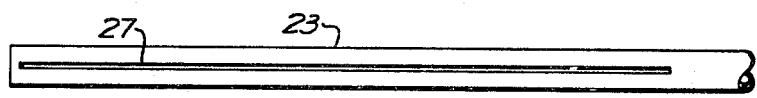
Figure 3:
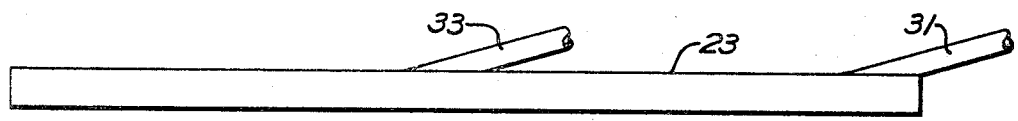

The foregoing objects will become more apparent in view of the accompanying drawing in which FIGURE 1 is a diagrammatic view of one embodiment in accordance with this invention; FIGURE 2 is a view taken along the lines II—II of FIGURE 1 and FIGURE 3 is a diagrammatic view of a second embodiment in accordance with this invention.

The apparatus forms a solidified plastic suitable for use with all types of highly reactive ingredients that include a mixing device for intimately combining the reactants of a plastic and distributing means whereby the mixed reactants are applied to a surface as a coherent, continuous, free-falling film within 75% of the "gel time" of the reactive mixture. The "gel time" is defined as the period of time from mixing the reactants until solidification occurs. The throughput of the mixing device is substantially equivalent to the throughput of the distributing device. This is to insure that the material is mixed and passed through the distributing device without portions of it being retained therein. The distributing device is thus designed so the velocity therein is sufficiently high to prevent build-up through a self-scouring action. By "self scouring" is meant that the material moves continually through the device at a rapid rate which not only prevents build-up of material within the device, but carries out any build-up that may have occurred. The velocity within the distributing device should be at least 75 feet per minute to obtain a scouring action. The distributing device is in the form of a tube having a slit in the bottom thereof which permits the liquid reactive mixture to fall freely as a coherent, continuous film onto the surface which moves relative to the distributing means. By this technique, a uniform thickness of the liquid reactive mixture is applied to the surface. When a cellular product is being prepared, expansion takes place due to the action of a blowing agent and a cellular polyurethane of uniform thickness results. When a non-porous product is prepared, a highly uniform coating results.

It is to be emphasized that the method concerned herein relates to the method and apparatus for preparing a uniform thickness cellular polyurethane or plastic layer and not to the specific chemical reactants or to the chemistry involved in the preparation of cellular polyurethanes. In all systems, the reactants which are capable of forming a cellular polyurethane will have a "cream time." It should be understood that the invention herein relates to all such systems. Further, the apparatus is suitable for applying uniform coatings of any plastic material that is prepared from highly reactive ingredients such as catalyzed, unsaturated polyesters, glycidyl polyethers, nonporous polyurethanes and the like.

With regard to the method of preparing cellular polyurethanes, the reactive components such as an organic polyisocyanate, an active hydrogen containing compound such as a polyester or polyether and a blowing agent, whether it be water or a volatile material such as fluorohydrocarbons such as trichlorofluoromethane or the like are first intimately mixed together and then immediately passed through an aperture in order that a coherent, continuous, free-falling liquid film is applied to a surface moving beneath the aperture. It is necessary that these steps all occur within 75% of the "cream time" of the particular mixture of reactive components. If, for example, the "cream time" of a particular formulation for preparing a cellular polyurethane is 10 seconds, it is necessary that the material be applied to the surface or into a mold in a period of less than 7.5 seconds after the reactants are initially contacted with each other in the mixing step. It is further stressed that the invention described herein is applicable regardless of the width of the foam slab to be produced. It may, in some instances, be necessary to provide more than one mixing apparatus which discharges into the conduit containing the aperture in order to prepare wide blocks. Regardless of the width of the cellular polyurethane slab or block to be prepared, the aperture or slit in the distributing means will correspond in length to the width of the block to be prepared.

The invention will be further described in more detail with regard to the attached drawing. In FIGURE 1, a mixing device 11 having two inlets 13 and 15, which inlets join the mixing device to suitable reservoir means 17 and 19 respectively, is connected at the discharge end 21 to the end of an elongated tube 23 having a sealed end 25. The elongated tube 23 has in the bottom thereof an elongated slit or aperture 27 running the length thereof. This elongated slit is shown in greater detail in FIGURE 2. The cross-sectional area of the tube 23 and the size of the slit 27 is designed such that the throughput of the tube 23 is substantially equivalent to the throughput of the mixing device 11. It is to be understood that the throughputs of specific mixing devices can be varied depending upon the pressure under which the ingredients are introduced, the speed of operation, should the device contain a mechanical agitator, and the like and therefore, different size distributing means are adaptable to be used with the same mixing device. It is to be understood further, that any suitable device for mixing the ingredients of a cellular polyurethane can be used as the device 11 in accordance with this invention. Suitable devices of this type are disclosed in Reissue Patent 24,514.

Beneath the distributing device 23 is disposed a means 29 for moving a surface relative to the device 23. This may encompass a conveying means or any other suitable technique known in the urethane art.

The width of the slit or aperture 27 disposed in the distributing means 23, may be uniform or it may vary as the distance from the inlet to the distributing means increases. This is to allow for the pressure drop within the tube and to insure that a coherent, continuous, free-falling liquid film emerges from the distributing means and is uniformly deposited on the surface 29. Further, it is desirable that the width of the aperture 27 be adjustable along the entire length of the distributing means 23. This can be accomplished in the simplest manner by a series of clamps disposed along the length of the distributing means 23.

While the apparatus is applicable to the fabrication of any type of plastic from highly reactive components, the operation thereof will be described with relation to cellular polyurethanes. In preparation, the reactive ingredients of a cellular polyurethane are introduced into the mixing device 11 through conduits 13 and 15 which connect the mixing device to reservoirs 17 and 19 respectively. It is, of course, to be understood that suitable valves and pumps can be located in the conduits 13 and 15 respectively in order to insure that the reactive ingredients are maintained in correct proportions in the device. This is commonly well-known technology in the urethane art and does not form a part of this invention. The reactive ingredients including a blowing agent, a catalyst and any other necessary components thereof are intimately combined in a mixing device and are passed therefrom into the distributing means 23 where they emerge as a coherent, continuous, free-falling film on and across the width of the surface 29. The period of time from the initial contact of the reactive components to the time when the free-falling liquid film touches the surface 29 must be less than 75% of the "cream time" of the reactive components of the cellular polyurethane formulation.

FIGURE 3 illustrates an embodiment of the invention wherein more than one inlet is provided to the distributing tube 23. Inlets 31 and 32 are shown which intercept the distribution tube 23 at an acute angle in order to aid the flow of the reactive mixture within the tube 23 without forcing an excess of the reactive mixture through the slit 27 at the point of juncture between the inlets 31 and 32 and tube 23. For extremely wide foam slabs, it may be desirable to utilize a plurality of inlets such as shown in FIGURE 3.

The invention is further illustrated but not limited by the following example in which parts are by weight unless otherwise specified.

EXAMPLE 1

The apparatus, in accordance with FIGURE 1, is used wherein the distributing tube 23 has an internal diameter of approximately ¼ inch and is attached on one end to an apparatus as shown in FIGURE 1 of Reissue Patent 24,514.

The reactive components of a cellular polyurethane plastic are mixed in the mixing device in the following proportions; about 100 parts of a mixture of about 75% of a polyether triol and about 25% of a polypropylene ether glycol having a molecular weight of about 2000 and an hydroxyl number of about 56; 50 parts of an isomeric mixture of 80% 2,4- and 20% 2,6-tolylene diisocyanate; 4 parts of water, 0.05 part of triethylene diamine; 2 parts of an oxyalkylene block copolymer having the structure shown in U.S. Patent 2,834,748; and 0.2 part of stannous octoate. The polyether triol has a molecular weight of about 3000 and an hydroxyl number of 57 and is prepared by first condensing glycerine with propylene oxide and then reacting about 30% of the hydroxyl groups of the resulting polypropylene ether triol with ethylene oxide.

The polyol is introduced at the rate of 6490 grams/min. at a temperature of about 29° C. and a pressure of 1150 p.s.i. The tolylene diisocyanate is introduced at a rate of 3000 grams/min. at a pressure of 700 p.s.i. A pre-mix is made of the water, triethylene diamine and siloxane oxyalkylene block polymer and this is introduced at a rate of 365 grams/min. and the stannous octoate is introduced at a rate of 132 grams/min. The mixed material exiting from the mixing apparatus is immediately passed into the distributing tube 23 and is discharged therefrom through the slit provided in the bottom thereof as a coherent, continuous, free-falling liquid film. The film is permitted to fall onto the conveyor from the distributing means and form an even coating thereon which upon reaction rises to a uniform height.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method for preparing a polymeric coating from highly reactive components which react to form said polymer which comprises mixing the ingredients of said polymer, said ingredients having a given gel time, passing the mixed ingredients through a shaping aperture so the material emerging therefrom is a coherent, continuous, free-falling liquid film, depositing said free-falling film within less than 75% of said given gel time onto said surface movable with respect to and disposed beneath said shaping aperture, the velocity of said mixed ingredients immediately before passing through said shaping aperture being at least 75 feet per minute.

2. A method of preparing cellular polyurethane plastics having a uniform surface which comprises mixing the ingredients of a cellular polymer, said ingredients having a given "cream time," passing the mixed ingredients through a shaping aperture so that material emerging therefrom is a coherent, continuous, free-falling liquid film and depositing said free-falling film within less than 75% of said given "cream time" onto a surface movable with respect to and disposed beneath said shaping aperture.

3. The method of claim 2 wherein the velocity of said mixed ingredients immediately before passing through said shaping aperture is at least 75 feet per minute.

4. An apparatus for applying a uniform coating of a polymer prepared from highly reactive ingredients onto a surface beneath and moving relative to said apparatus which comprises a means for intimately mixing said reactants and a distributing means connected to said mixing means for applying to said surface said mixed reactants as a coherent, continuous, free-falling liquid film, said distributing means being disposed transversely to said surface, said distributing means having dimensions such that the throughput of said distributing means is substantially equivalent to the throughput of said mixing means and the velocity therein of said mixed reactants is sufficient to prevent material build-up through a self-scouring action, the residence time of said combined mixing and said distributing means being less than 75 percent of the "gel time" of said reactants.

5. The apparatus of claim 4 wherein said distributing means is connected to said mixing means by a plurality of conduits entering said distribution means at an acute angle and disposed at spaced intervals along the length of said distributing means.

6. The apparatus of claim 4 wherein the distributing means is dimensioned such that the velocity therein is at least 75 feet per minute.

References Cited

UNITED STATES PATENTS

| 3,181,199 | 5/1965 | Voelker | 264—47 XR |
| 3,226,457 | 12/1965 | Smith | 264—47 XR |
| 3,240,845 | 3/1966 | Voelker | 264—45 |
| 3,341,354 | 9/1967 | Woods et al. | 118—324 XR |

OTHER REFERENCES

Mobay Chemical Co. Publication, "A One-Shot System for Flexible Polyether Urethane Foams," Nov. 10, 1958, pp. 1–4.

Bowman, R. A.: "Engineer's Report: Rigid Polyurethane Foam Techniques," In Plastics World. February 1963, pp. 20–23.

Dickert, E. A.: "Molding of One-Short Rigid Urethane Foam," in Chemical Engineering Progress (vol. 59, No. 9), September 1963, pp. 33–38.

JULIUS FROME, *Primary Examiner.*

P. E. ANDERSON, *Assistant Examiner.*

U.S. Cl. X.R.

117—105.5, 161; 264—54, 216; 118—324; 260—2.5